United States Patent [19]
Saito et al.

[11] Patent Number: 5,621,347
[45] Date of Patent: Apr. 15, 1997

[54] ELECTRONIC CIRCUIT HAVING ELECTRICALLY ISOLATED DIGITAL AND ANALOG CIRCUITRY

[75] Inventors: Hiroyuki Saito; Yoichi Seki; Akira Ito, all of Yotsukaido, Japan

[73] Assignee: Seiko Precision Inc., Japan

[21] Appl. No.: 288,485

[22] Filed: Aug. 10, 1994

[30] Foreign Application Priority Data

Aug. 11, 1993 [JP] Japan ................ 5-044001 U
Mar. 16, 1994 [JP] Japan .................. 6-045843

[51] Int. Cl.$^6$ ................ G05F 1/10; G05F 3/02
[52] U.S. Cl. ............ 327/540; 327/545; 327/565; 327/514
[58] Field of Search ............... 327/530, 538, 327/540, 541, 542, 543, 544, 545, 546, 564, 565, 566, 514

[56] References Cited

U.S. PATENT DOCUMENTS

| | | | |
|---|---|---|---|
| 4,062,024 | 12/1977 | Tsunekawa et al. | 354/60 |
| 4,167,332 | 9/1979 | Sakurada et al. | 356/227 |
| 4,716,307 | 12/1987 | Aoyama | 327/543 |
| 4,833,341 | 5/1989 | Watanabe et al. | 327/541 |
| 4,928,056 | 5/1990 | Pease | 327/541 |
| 5,175,451 | 12/1992 | Ihara | 327/543 |
| 5,313,112 | 5/1994 | Macks | 327/545 |
| 5,347,170 | 9/1994 | Hayakawa et al. | 327/541 |
| 5,373,477 | 12/1994 | Sugibayashi | 327/541 |

FOREIGN PATENT DOCUMENTS 2831529  2/1979  Germany.
3536401  4/1986  Germany.

Primary Examiner—Timothy P. Callahan
Assistant Examiner—My-Trang Nu Ton
Attorney, Agent, or Firm—Adams & Wilks

[57] ABSTRACT

In order to reduce noise in a controlling circuit including digital circuitry and analog circuitry constructed together on a single CMOS integrated circuit, a regulator is constructed as part of the integrated circuit. A power supply is directly connected to the digital circuitry, and a voltage output of the regulator is supplied to the analog circuitry. The output state of the regulator may be controlled by a switch. Degradation of the performance characteristics of the analog circuitry while the digital circuitry is being operated can be prevented by electrically isolating the power supply to the digital circuitry from the power supply to the analog circuitry. Since the regulator is built into the integrated circuit, the number of externally provided components is thereby reduced, further contributing to the downsizing of an electronic device such as a camera. Furthermore, even when the power supply of the digital circuitry fluctuates greatly, the effects on the analog circuitry are minimized.

27 Claims, 4 Drawing Sheets

ELECTRONIC CIRCUIT HAVING ELECTRICALLY ISOLATED DIGITAL AND ANALOG CIRCUITRY

BACKGROUND OF THE INVENTION

The present invention generally relates to an electronic control circuit and more particularly relates to an integrated circuit having digital and analog circuitry integrated thereon which are electrically isolated by a voltage regulator.

Conventionally, in an electronic circuit for controlling the operation of a device such as a camera, digital integrated circuitry such as a calculating circuit, and analog integrated circuitry for performing light metering and distance measuring functions, for example, have not been combined in a single integrated circuit, but have instead been formed in different integrated circuits. This is due to the fact that digital and analog circuitry, although capable of being integrated, are fundamentally incompatible in terms of their operating characteristics, power requirements and noise tolerance. Because of this incompatibility, interface circuitry permitting communication between digital circuitry and analog circuitry is usually repaired. Consequently, a large space is needed to accommodate the circuitry, which is extremely disadvantageous in a camera, for example, wherein compactness is of primary importance.

In this connection, it has been proposed in Laid-Open Patent Application No. Hei 1-258459 that digital circuitry, such as a microcomputer for processing digital signals, and analog circuitry, such as a photometer circuit, for processing analog signals, can be constructed within a single chip using CMOS integrated circuit technology and that a power supply for the respective digital and analog circuitry can be commonly shared along with the same power supply for powering the peripheral circuitry, such as a light source, a shutter, a motor, and the like.

In this proposed integrated circuit, in order to shield the analog circuitry from electromagnetic noise produced by the digital circuitry and peripheral circuitry, the digital circuitry and control lines therefor are physically located away from the analog circuitry. In this manner, the performance of the analog circuitry is not deteriorated due to noise caused by the digital circuitry. An electrolytic capacitor is connected outside the integrated circuitry to suppress spurious variation in the power supply voltage supplied to the analog circuitry.

Even when such countermeasures have been taken to eliminate noise as described above, they have not been completely successful. For instance, in cases where the analog circuitry must process signals having a very small amplitude or when the power supply fluctuates due to the operation of the digital circuitry, the performance of the analog circuitry nevertheless deteriorates. Furthermore, when an electrolytic capacitor and a regulator are externally connected, additional mounting space is required and this is also disadvantageous in terms of space.

SUMMARY OF THE INVENTION

In order to overcome the aforementioned drawbacks and to maintain high performance of the analog circuitry even when the power supply voltage fluctuates due to the operation of digital circuitry, in the present invention a regulator circuit is formed in an integrated circuit having commonly integrated digital and analog circuitry, and the power supplies to the digital circuitry and the analog circuitry are thereby isolated.

A switch means may be provided for turning ON or OFF the output of the regulator such that when the power supply of the digital circuitry fluctuates greatly (although within permissible limits for digital circuitry), the supply of the power to the analog circuitry is electrically disconnected such that the analog circuitry becomes immune to such power source fluctuation. During these times, the analog circuitry is powered by stored energy, for example, by a capacitor connected between the regulator output and the analog circuitry. The resulting effect of noise on the analog circuitry is thereby minimized.

In a preferred embodiment of the present invention, both the digital circuitry and the analog circuitry are formed in a single CMOS integrated circuit, and a voltage regulator is provided therein. The power supply terminals are directly connected to the digital circuitry, and the power supply as regulated by the voltage regulator is supplied to the analog circuitry.

DETAILED DESCRIPTION OF THE PREFERRED EMBODIMENTS

Figure 1:
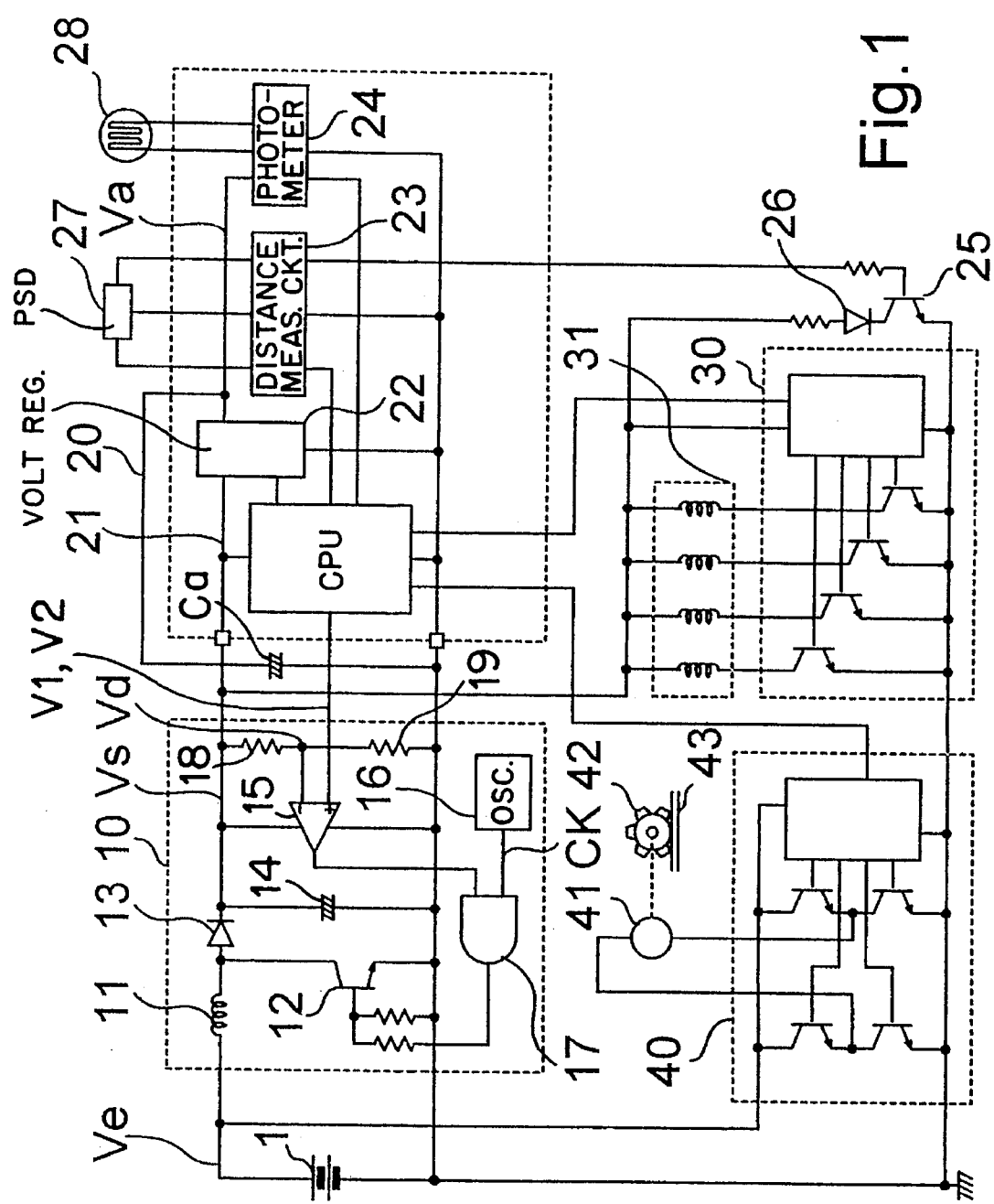
FIG. 1 is a block diagram showing an embodiment of the present invention.

Details of a preferred embodiment of the present invention will now be explained in accordance with FIG. 1. In this embodiment, the inventive circuit is described as a controlling circuit for an electronic camera. It should be appreciated, however, that the present invention may be used in any electronic device in which analog and digital circuitry are used.

A power cell 1 serves as a power supply for the camera, and the cell 1 may comprise, for instance, a lithium cell with a nominal voltage Ve of 3 V. Any type of power cell may be used, such as a copper-zinc or magnesium-type cell. A booster circuit 10 is connected to both terminals of the cell 1. The booster circuit 10 is constructed of a coil 11, a transistor 12, a diode 13, and a capacitor 14, the combination of which constitutes a known chopper-type booster circuit. In the booster circuit 10 of this embodiment, a comparator 15, an oscillator 16, a resistor 18, and a resistor 19 are also included. These components serve to detect the boosted voltage of the booster circuit 10 and start or stop the voltage boosting operation. A variable output voltage Vs is output by the booster circuit 10 and input to an IC 20.

The IC 20 is a single chip CMOS integrated circuit and contains a microprocessor or microcomputer (CPU) 21, a voltage regulator 22, a distance measuring circuit 23, and a photometer circuit 24. The distance measuring circuit 23 controls a transistor 25 to drive a near infrared light-emitting element ("IRED") 26 at a constant current. The distance measuring circuit 23 also converts a light signal received by a unidimensional semiconductor light-receiving element 27, commonly known as a position sensitive device ("PSD"), into distance information and outputs this distance information to the microcomputer 21. A photosensor, for example, a cadmium sulphide photosensor ("CdS") 28 is connected to the photometer circuit 24. The photosensor 28 measures the brightness level of the subject being photographed and converts the brightness level into a brightness signal and outputs the brightness signal to the microcomputer 21.

A shutter drive circuit 30 is driven by the voltage Vs of the booster circuit 10 and controls a conventional stepping motor-type shutter 31 in accordance with a control signal from the microcomputer 21 to open and close blade sectors (not shown) of the shutter 31 for exposing a photographic film (not shown). A DC motor drive circuit 40 is powered by the voltage Ve of the power cell 1 and controls a DC motor 41 in accordance with a control signal from the microcomputer 21 to rotate a sprocket 42 for advancing the film.

The operation of this circuit will now be described. When the power supply of the camera is turned ON, the power cell 1 supplies power to the microcomputer 21 via the coil 11 and the diode 13. When the voltage applied to the microcomputer 21 exceeds a predetermined voltage VO (for example, 2.4 V), the microcomputer 21 becomes activated. The microcomputer 21 first outputs a reference voltage V1 to the comparator 15. The comparator 15 compares the reference voltage V1 with a voltage Vd produced by dividing the voltage Vs by means of a voltage divider consisting of the resistor 18 and the resistor 19 and outputs a high ("H") level signal when the voltage V1 is higher than the voltage Vd.

The output of the comparator 15 is input to an AND gate 17 along with the output of the oscillator 16, and the oscillator 16 drives the transistor 12 upon the condition that V1>Vd. That is, when the voltage Vd is lower than the reference voltage V1 output by the microcomputer 21, the output of the oscillator 16 is input to the transistor 12 and voltage boosting is performed by the boosting circuit 10 such that the voltage Vs is boosted to the level of the reference voltage V1. When the voltage Vd is higher than the voltage V1, sufficiently high voltages are being applied to the respective circuits, and since the comparator 15 outputs a low ("L") level signal, no voltage boosting is carried out by the boosting circuit 10. Thus, the boosted voltage Vs (for example, 5.0 V) is stored in the capacitor 14 and is output to subsequent stages of the circuit.

When the camera enters the exposure operation, the microcomputer 21 commences the photographing operation and outputs a voltage V2, which is higher than the voltage V1, to the comparator 15, thereby increasing the boosted voltage Vs to the level of the voltage V2 (for example, 5.5 V) to enable higher power to be supplied to subsequent stages of the circuit. The regulator 22 is then turned ON to supply power to the distance measuring circuit 23 and photometer circuit 24 at a constant voltage despite any further variation in the level of the boosted voltage Vs.

Next, the microcomputer 21 sends a command to the distance measuring circuit 23 to control the transistor 25 to pulse-drive the IRED 26 to emit a pulsed infrared light beam. The light reflected from the subject being photographed is received by the PSD 27, and the distance to the subject being photographed is converted into an electrical signal. When the light-emitting operation is completed, the microcomputer 21 ceases supplying the voltage V2 to the IRED 26 and the microcomputer 21 calculates the distance to the subject being photographed from the distance signal. The microcomputer 21 then outputs the voltage V1 to the comparator 15.

With the photometer circuit 24 so enabled, the microcomputer 21 sends a command to the photometer circuit 24 and converts the brightness of the subject being photographed from the CdS sensor 28 into a brightness signal. The microcomputer 21 calculates the brightness of the subject being photographed from this brightness signal in order to determine an optimum exposure time. Then, the microcomputer 21 Controls the shutter drive circuit 30 in accordance with an optimum exposure program selected in accordance with the distance and the brightness calculated by the above-described operation and the shutter 31 is driven to expose the photographic film for the calculated exposure time to perform an exposure operation. When the exposure is completed, the booster circuit 10 is controlled in the above manner and the DC motor 41 is driven to rotate the sprocket 42 so that the film 43 is advanced by one frame. When the above-explained series of photographic operations is completed, the microcomputer 21 turns OFF the regulator 22.

Figure 2:
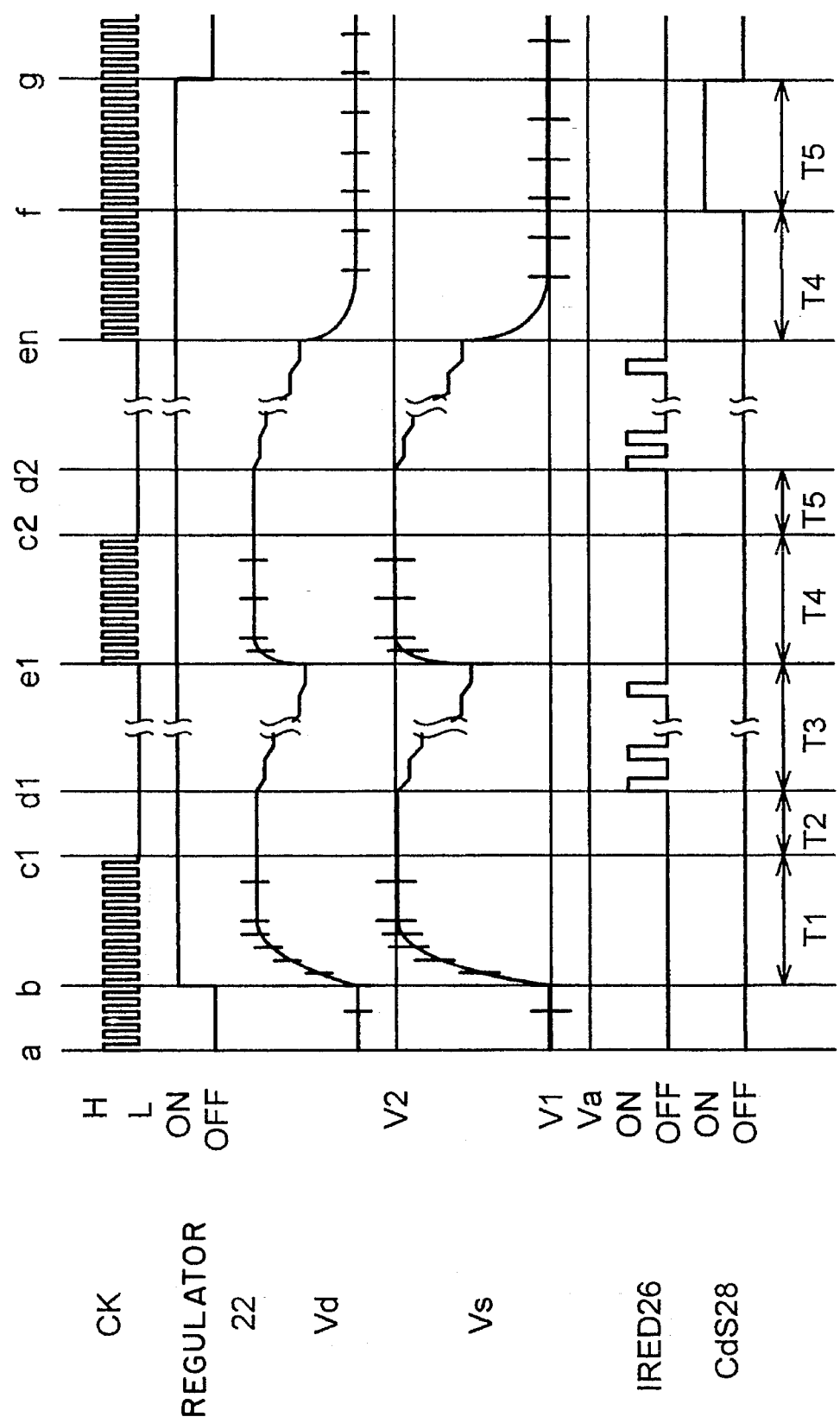
FIG. 2 is a timing chart of the embodiment of the present invention.

In FIG. 2 there is shown a timing diagram of the photographing operation described above. Before entering into the exposure operation, the regulator 22 is OFF (time "a" to "b" of FIG. 2), so that the distance measuring circuit 23 and the photometer circuit 24 are deactivated. Meanwhile, the voltage Ve of the power cell is raised to a voltage Vs which is set at a predetermined reference voltage V1 by the microcomputer 21 as described above, and the microcomputer 21 is then operated at the predetermined voltage V1. When the distance-measuring circuit 23 and the photometer circuit 24 are controlled by the microcomputer 21 to shift from OFF to ON ("b" of FIG. 2), the voltage Vs is controlled to be boosted to the voltage V2 during a time period T1 ("b" to "c1" of FIG. 2) and the regulator 22 is turned ON. At this time, both the microcomputer 21 and the IRED 26 are operated at the predetermined voltage V2, and both the distance measuring circuit 23 and the photometer circuit 24 are operated at the voltage Va (for instance, 4.8 V) output by the regulator 22. Thereafter, in order to reduce the effect of noise, the booster clock is stopped by the microcomputer 21, which ceases to output a voltage to the comparator 15, and the microcomputer 21 and the IRED 26 are operated only by the charge stored in the capacitor 14.

When a predetermined time period T2 has elapsed after the boosting operation is ceased ("c1" to "d1" of FIG. 2), the microcomputer 21 sends a control signal to the distance measuring circuit 23 to pulse-drive the IRED 26 for a time period T3 ("d1" to "e1" of FIG. 2). Since the charge in the capacitor 14 is used as the load current of the distance measuring circuit 23 for the radiation of the IRED 26, at this time the voltage Vs gradually falls from the level of the voltage V2. However, since the voltage applied to the distance measuring circuit 23 and the photometer circuit 24 is controlled by the regulator 22, the stabilized voltage Va is supplied to the distance measuring circuit 23 and the photometer circuit 24 throughout the entire photographing operation, whereby the effects caused by fluctuations in the supply voltage to these analog circuits are substantially reduced.

When the light projecting operation ("c1" to "e1" of FIG. 2) is repeatedly performed n times, thereby completing the distance measuring process ("en" of FIG. 2), the microcomputer 21 outputs the voltage V1 to the comparator 15, and the distance to the subject being photographed is calculated from the distance signal ("f" of FIG. 2). Then, the microcomputer 21 stands by for a time period T4 to permit stabilization of the voltages Vs and Vd. The microcomputer then controls the photometer circuit 24 to perform light metering over a time period T5 ("f" to "g" of FIG. 2). When the light metering operation is completed, the regulator 22 is turned OFF to cut off the supply of power to the distance measuring circuit 23 and the photometer circuit 24.

Figure 3:
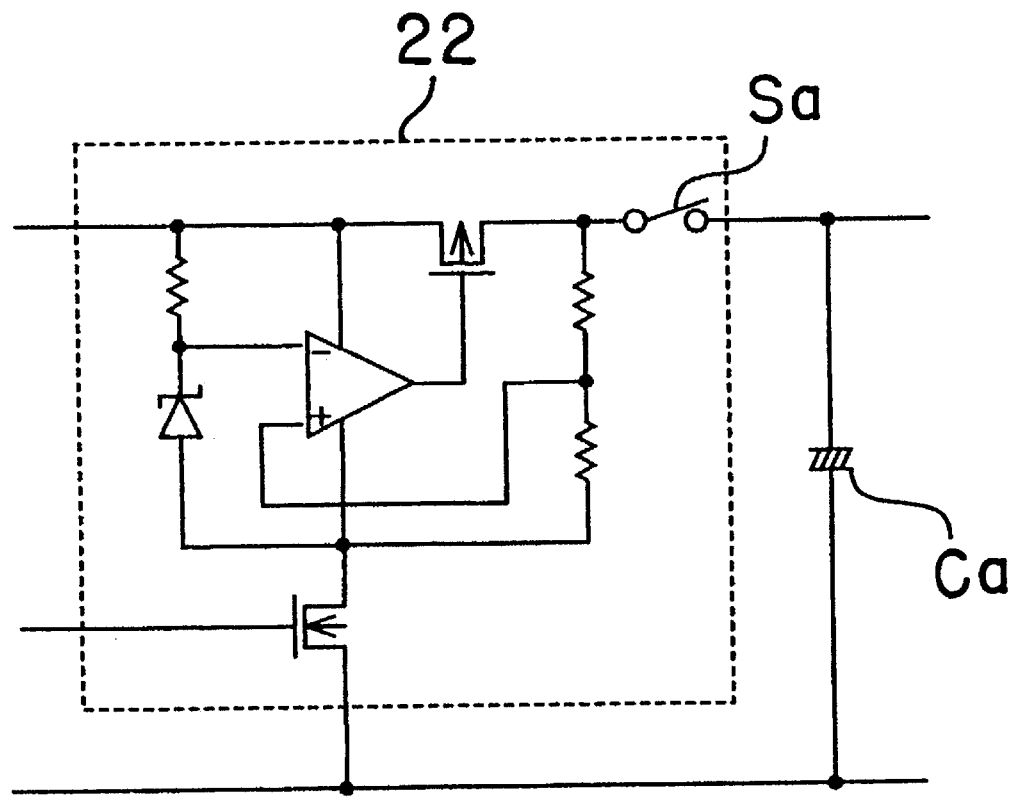
FIG. 3 is a block diagram showing the internal construction of a regulator circuit 22 shown in FIG. 1.
Figure 4:
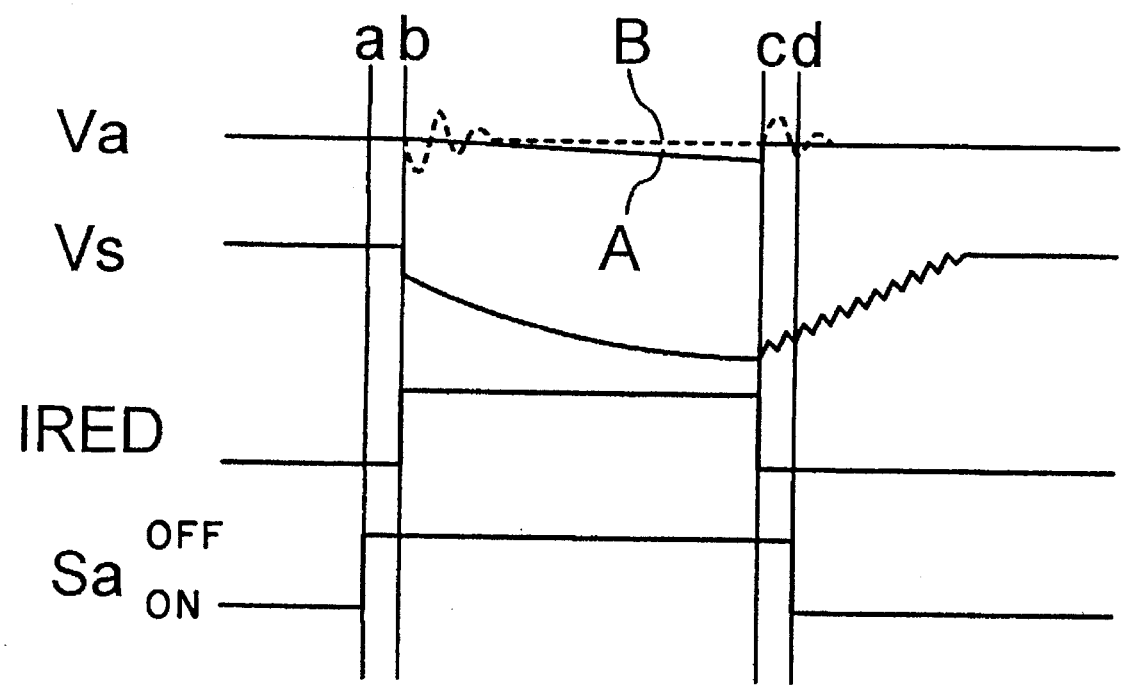
FIG. 4 is a partial enlargement of the timing chart of FIG. 2.

A second embodiment of the present invention is shown in FIG. 3 in which a switch Sa is provided in the output stage of the regulator 22, separate from the switch for controlling the power supply of the regulator 22 itself. This switch Sa can be controlled by a signal from the microcomputer 21 and is, for example, a normally closed switch which may comprise a properly biased transistor, a diode, or may be of mechanical construction. A capacitor Ca is connected to the output of the regulator 22. In FIG. 4 there is shown an enlargement of the timing chart of FIG. 2 from "d1" to "e1".

Prior to driving the IRED 26, the microprocessor 21 turns OFF (opens) the normally closed switch Sa ("a" of FIG. 4) by sending a signal thereto. As a result, the output of the regulator 22 is cut off, and the power supply to the distance measuring circuit 23 and the photometer circuit 24 is supplied exclusively by the capacitor Ca. When the IRED 26 is driven by the Vs output of the boosting circuit 10 ("b" of FIG. 4), although the voltage Vs is slightly lowered, since the voltage Va across the terminals of the capacitor Ca is electrically independent from the voltage Vs, the variation in voltage Va is small and is unaffected by the driving of the IRED 26. The solid line "A" of FIG. 4 shows the variation in the output voltage Va of the regulator 22 when the switch Sa is turned OFF, and the broken line "B" of FIG. 4 shows the variation in the output voltage Va of the regulator 22 when the switch Sa is turned ON. When the irradiation by the IRED 26 is ended ("c" of FIG. 4), the microcomputer 21 turns ON the switch Sa to restart the supply of power to the distance measurement circuit 23 and the photometer circuit 24 ("d" of FIG. 4). The operation defined from "a" to "d" of FIG. 4 is repeatedly performed every time the IRED 26 emits light.

Deterioration of the performance of the analog circuitry while the digital circuitry or peripheral circuitry is operating can be prevented by isolating the power supply of the digital circuitry from the power supply of the analog circuitry by means of a voltage regulator. Since the regulator is built-in to the integrated circuit, the number of externally provided components is reduced, further contributing to the downsizing of the electronic camera.

Moreover, in the second embodiment, although the power supply of the digital circuit fluctuates greatly even within permissible constraints, the supply of power to the analog circuit unit is cut off and the effects on the analog circuitry are thereby further minimized.

We claim:

1. An electronic circuit comprising: a voltage providing means for providing a first output voltage; digital circuit means powered by the first output voltage for processing a digital signal; a voltage regulator powered by the first output voltage for providing a second output voltage; and analog circuit means powered by the second output voltage for processing an analog signal; wherein the digital circuit means, the voltage regulator and the analog circuit means are formed in a single integrated circuit.

2. An electronic circuit according to claim 1; wherein the voltage providing means comprises a power source for outputting a source voltage and boosting means for boosting the source voltage to the first output voltage in accordance with a control signal.

3. An electronic circuit according to claim 1; further comprising first means for electrically disconnecting the voltage regulator from the analog circuit means; first energy storage means for providing power to the analog circuit means when the first means is activated;

second means for electrically disconnecting the voltage providing means from the digital circuit means and the voltage regulator; second energy storage means for providing power to the digital circuit means and to the voltage regulator when the second means is activated; and control means for controlling the first and second means such that a power supplied to the analog circuit means is not affected by noise caused by operation of the digital circuit means.

4. An electronic circuit according to claim 1; further comprising first means for electrically disconnecting the voltage providing means from the digital circuit means and the voltage regulator; and energy storage means for supplying power to the digital circuit means and to the voltage regulator when the first means is activated such that a power supplied to the analog circuit means is not affected by noise caused by operation of the digital circuit means.

5. An electronic circuit according to claim 1; further comprising a peripheral circuit powered by the first output voltage; and wherein the voltage providing means comprises a power source for outputting a source voltage and boosting means for boosting the source voltage to the first output voltage in accordance with a control signal such that a voltage input to the analog circuit means is not affected by a variation in the first output voltage caused by operation of the digital circuit means or the peripheral circuit.

6. An electronic circuit according to claim 5; further comprising means for electrically disconnecting the voltage regulator from the analog circuit means such that a power supplied to the analog circuit means is not affected by a noise caused by operation of the digital circuit means or the peripheral circuit.

7. An electronic circuit according to claim 5; further comprising means for electrically disconnecting the boosting means from the digital circuit means, the peripheral circuit and the voltage regulator; and first energy storage means for supplying power to the digital circuit means, the peripheral circuit and the voltage regulator when the means for disconnecting is activated such that a power supplied to the analog circuit means is not affected by a noise caused by the digital circuit means and the peripheral circuit.

8. An electronic circuit according to claim 7; further comprising second energy storage means for providing power to the analog circuit means when the means for disconnecting is activated in order to permit continued operation of the analog circuit means during operation of the digital circuit means and the peripheral circuit such that a power supplied to the analog circuit means is not affected by a noise caused by operation of the digital circuit means and the peripheral circuit.

9. An electronic circuit according to claim 1; further comprising a peripheral circuit powered by the first output voltage; first means for electrically disconnecting the voltage regulator from the analog circuit means; first energy storage means for providing power to the analog circuit means when the first means for disconnecting is activated; second means for electrically disconnecting a boosting means from the digital circuit means, the peripheral circuit and the voltage regulator; and second energy storage means for providing power to the digital circuit means, the peripheral circuit and the voltage regulator when the second means for disconnecting is activated; and control means for controlling the first and second means for disconnecting such that a power supplied to the analog circuit means is not affected by a noise caused by operation of the digital circuit means and the peripheral circuit.

10. An electronic circuit according to claim 9; wherein the digital circuit means comprises a microcomputer for controlling the boosting means to boost the source voltage to the first output voltage, and for controlling the first means for disconnecting and the second means for disconnecting such that a power supplied to the analog circuit means is not affected by a noise caused by operation of the digital circuit means and the peripheral circuit.

11. In a camera having a shutter and having the electronic circuit of claim 9; wherein the digital circuit means includes a microcomputer; the analog circuit means includes means for measuring light intensity and means for measuring object distance; and the peripheral circuit includes light-emitting means and shutter driving means for driving the shutter.

12. An electronic circuit according to claim 1; further comprising first means for electrically disconnecting the voltage regulator from the analog circuit means such that a power supplied to the analog circuit means is not affected by a noise caused by operation of the digital circuit means.

13. An electronic circuit according to claim 12; further comprising first energy storage means for providing power to the analog circuit means when the first means is activated in order to permit continued operation of the analog circuit means during operation of the digital circuit means such that a power supplied to the analog circuit means is not affected by a noise caused by operation of the digital circuit means.

14. An electronic circuit according to claim 13; further comprising second means for electrically disconnecting the voltage providing means from the digital circuit means and from the voltage regulator such that a power supplied to the analog circuit means is not affected by a noise caused by the digital circuit means.

15. An electronic circuit according to claim 14; further comprising second energy storage means for providing power to the digital circuit means and the voltage regulator when the second means for disconnecting is activated.

16. An electronic circuit comprising: a voltage providing means for providing a first output voltage; digital circuit means powered by the first output voltage for processing a digital signal; a voltage regulator powered by the first output voltage for providing a second output voltage; analog circuit means powered by the second output voltage for processing an analog signal; and first means for electrically disconnecting the voltage regulator from the analog circuit means.

17. An electronic circuit according to claim 16; further comprising first energy storage means for providing power to the analog circuit means when the first means for disconnecting is activated in order to permit continued operation of the analog circuit means such that a power supplied to the analog circuit means is not affected by a noise caused by operation of the digital circuit means.

18. An electronic circuit according to claim 16; further comprising second means for electrically disconnecting the voltage providing means from the digital circuit means and from the voltage regulator; and second energy storage means for providing power to the digital circuit means and to the voltage regulator when the second means for disconnecting is activated such that power supplied to the analog circuit means is not affected by noise caused by operation of the digital circuit means.

19. An electronic circuit according to claim 18; further comprising a peripheral circuit powered by the first output voltage.

20. In a camera having a shutter and having the electronic circuit of claim 19; wherein the digital circuit means includes a microcomputer; the analog circuit means includes means for measuring light intensity and means for measuring object distance; and the peripheral circuit includes light-emitting means and shutter driving means for driving the shutter.

21. An electronic circuit according to claim 16; wherein the analog circuit means, the digital circuit means, and the voltage regulator are formed in a single integrated circuit.

22. An electronic circuit comprising: voltage providing means for providing a first output voltage'; digital circuit means powered by the first output voltage for processing a digital signal; a voltage regulator powered by the first output voltage for providing a second output voltage; analog circuit means powered by the second output voltage for processing an analog signal; first means for electrically disconnecting the voltage regulator and the analog circuit means; first energy storage means for providing a power to the analog circuit means when the first means is activated; second means for electrically disconnecting the voltage providing means from the digital circuit means and from the voltage regulator; second energy storage means for providing power to the digital circuit and to the voltage regulator when the second means is activated; and control means for controlling the first means for disconnecting and the second means for disconnecting such that a power supplied to the analog circuit means is not affected by a noise caused by operation of the digital circuit means.

23. An electronic circuit according to claim 22; wherein the voltage providing means comprises a power source for outputting a source voltage and boosting means for boosting the source voltage to the first output voltage in accordance with a control signal.

24. An electronic circuit according to claim 22; further comprising a peripheral circuit powered by the first output voltage.

25. An electronic circuit according to claim 24; wherein the digital circuit means comprises a microcomputer for controlling the boosting means to boost the source voltage to the first output voltage to operate the digital circuit means, the voltage regulator and the peripheral circuit, such that a power supplied to the analog circuit means is not affected by a noise caused by operation of the digital circuit means and the peripheral circuit.

26. In a camera having a shutter and having the electronic circuit of claim 24; wherein the digital circuit means includes a microcomputer; the analog circuit means includes means for measuring light intensity and means for measuring object distance; and the peripheral circuit includes light-emitting means and shutter driving means for driving the shutter.

27. An electronic circuit according to claim 22; wherein the analog circuit means, the digital circuit means and the voltage regulator are formed in a single integrated circuit.

* * * * *